(12) United States Patent
Carnegie (10) Patent No.: US 11,077,575 B1
(45) Date of Patent: Aug. 3, 2021

(54) CUTTING MAT

(71) Applicant: Lavern V. Carnegie, Washington, DC (US)

(72) Inventor: Lavern V. Carnegie, Washington, DC (US)

(*) Notice: Subject to any disclaimer, the term of this patent is extended or adjusted under 35 U.S.C. 154(b) by 71 days.

(21) Appl. No.: 15/954,755

(22) Filed: Apr. 17, 2018

Related U.S. Application Data (60) Provisional application No. 62/486,267, filed on Apr. 17, 2017.

(51) Int. Cl.
| | | |
|---|---|---|
| *B25B 11/00* | (2006.01) | |
| *B26D 7/01* | (2006.01) | |
| *B26D 7/00* | (2006.01) | |
| *B26D 7/28* | (2006.01) | |
| *B32B 33/00* | (2006.01) | |

(52) U.S. Cl.
CPC ............. *B26D 7/01* (2013.01); *B26D 7/0006* (2013.01); *B26D 7/28* (2013.01); *B32B 33/00* (2013.01); *B25B 11/00* (2013.01); *B32B 2250/02* (2013.01); *B32B 2325/00* (2013.01); *B32B 2327/06* (2013.01)

(58) Field of Classification Search
CPC ....... A47J 47/00; A47J 47/005; A47J 2201/00
See application file for complete search history.

(56) References Cited

U.S. PATENT DOCUMENTS

| | | | |
|---|---|---|---|
| 3,859,161 A | 1/1975 | McLeod | |
| 6,460,841 B1* | 10/2002 | Durr ..................... | A47J 47/005 269/289 R |
| 6,971,644 B1* | 12/2005 | Kennedy ............... | A47J 47/005 269/289 R |
| 2004/0056403 A1* | 3/2004 | Porchia ................. | A47J 47/005 269/289 R |
| 2009/0072464 A1* | 3/2009 | Ishai ....................... | B26D 7/20 269/289 R |
| 2009/0194925 A1* | 8/2009 | Rolf ...................... | A47J 47/005 269/302.1 |
| 2015/0069691 A1* | 3/2015 | Chen ..................... | A47J 47/005 269/55 |

FOREIGN PATENT DOCUMENTS

GB        1490022 A * 10/1977 ............... B32B 7/12

\* cited by examiner

*Primary Examiner* — Tyrone V Hall, Jr.
(74) *Attorney, Agent, or Firm* — Blank Rome LLP (57) ABSTRACT

A dual surface cutting mat for, but not limited to, sewing, crafts, design and drawing. Constructed of Expanded Polystyrene (EPS) or cork on one side and polyvinyl chloride (PVC) or corrugated fiberboard on the other.

12 Claims, 8 Drawing Sheets

CUTTING MAT

RELATED APPLICATIONS

This application claims the benefit of U.S. Provisional Application No. 62/486,267, filed Apr. 17, 2017, the entire contents of which are incorporated herein by reference.

BACKGROUND OF THE INVENTION

Field of the Invention

The invention relates to the use of a cutting mat for articles related to, but not limited to sewing, crafts, design and drawing projects. It focuses on a cutting mat surface that allows the easy and efficient layout and cutting of patterns, fabric and crafts without damage to the cutting mat with the use of straight pins.

BACKGROUND OF THE RELATED ART

Cutting mats are surfaces that serve as a guide and measurement tool allowing precision for various arts and crafts projects, including but not limited to sewing, drawing and design projects. Typically used for tabletop projects, they also provide protection for work surface areas. Projects often require clear cut lines, accuracy and reproducibility. The imprinted grid table, measuring tools and reference guides on cutting mats allow for this. Current mats have one functioning side or are reversible with both sides being made of the same material.

Polyvinyl chloride (PVC) mats provide a rigid, self-healing surface on which a rotary cutter may be used. This negates the repetitious movement and manipulation of scissors in obtaining precise cuts. PVC mats also require manipulation to keep fabric and crafts in place, even on a non-skid surface. Fabrics and crafts cannot be pinned directly to PVC mats and manipulation is required to keep them in place or pin them to pre-cut patterns. This is often relatively time consuming.

Corrugated fiberboard (cardboard) mats are very popular for design and fabric cutting but unlike the PVC mats, scissors have to be used. Whether pinned to sewing patterns pre-cut craft patterns or laid out on the mat, it is easier to keep the fabric or craft in place on a corrugated fiberboard cutting mat vs a PVC cutting mat. It does however require time consuming manipulation to pin fabric or crafts when using a corrugated fiberboard mat. Corrugated fiberboard mats are not self-healing and direct use of straight pins will limit their longevity.

SUMMARY OF THE INVENTION

The purpose of the invention is to provide a dual surface cutting mat that provides a working surface to greatly facilitate using straight pins to attach fabric or crafts to a pattern or to attach fabric or crafts to the mat for cutting. The invention allows for a decrease in the time required to manipulate pinning or stabilizing fabric and other items on conventional PVC and corrugated fiberboard mats.

BRIEF DESCRIPTION OF THE FIGURES

FIGS. 5(*a*)-(*d*) show a top view of a cutting mat having a measurement grid, and reference guide(s).

DETAILED DESCRIPTION OF THE PREFERRED EMBODIMENTS

In describing the illustrative, non-limiting preferred embodiments of the invention illustrated in the drawings, specific terminology will be resorted to for the sake of clarity. However, the invention is not intended to be limited to the specific terms so selected, and it is to be understood that each specific term includes all technical equivalents that operate in similar manner to accomplish a similar purpose. Several preferred embodiments of the invention are described for illustrative purposes, it being understood that the invention may be embodied in other forms not specifically shown in the drawings.

Turning to the drawings, FIGS. 1-5 show a cutting mat 100 in accordance with non-limiting example illustrative embodiments of the invention, including a tri-fold configuration (FIG. 1), multi-fold configuration (FIG. 2), encased configuration (FIG. 3), interlocking panel (FIG. 4), and showing a top display panel (FIG. 5).

Figure 1:
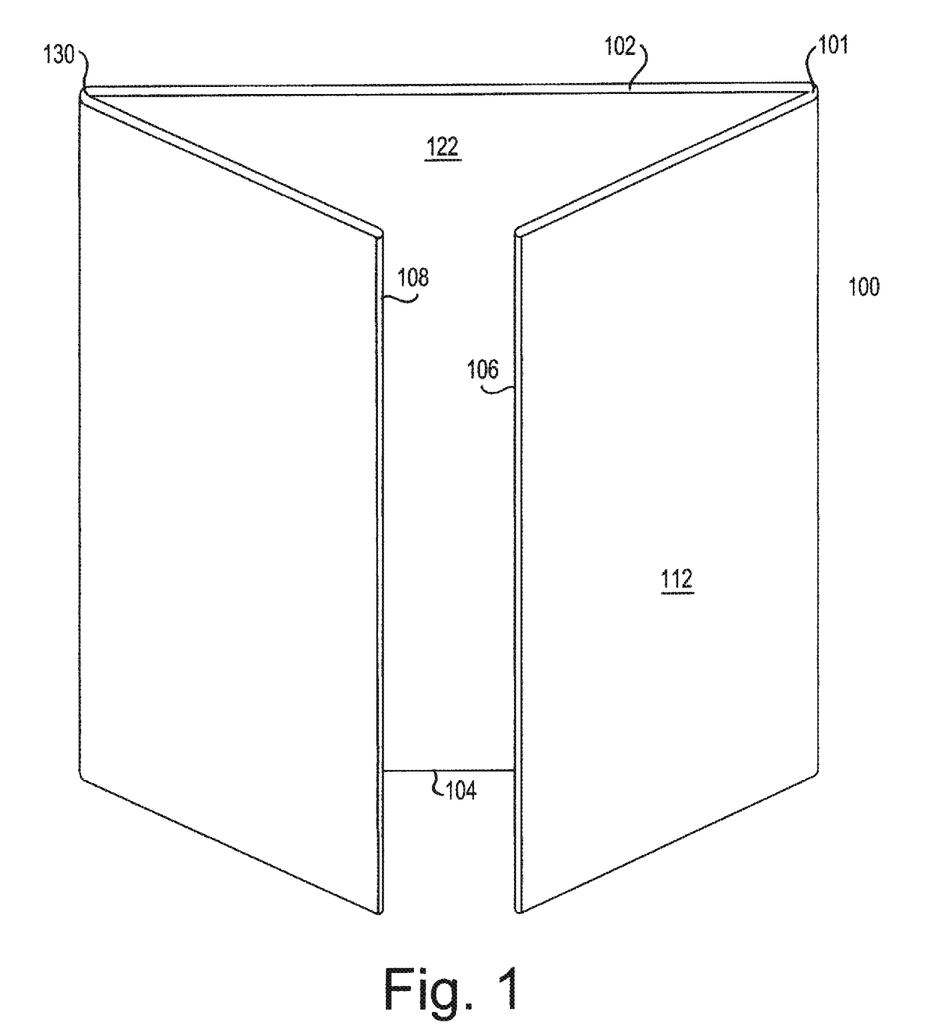
FIG. 1 is a perspective view of the tri-folded cutting mat having (Side A): Expanded Polystyrene (EPS) or Cork, and (Side B): Polyvinyl Chloride (PVC) or Corrugated Fiberboard.
Figure 2:
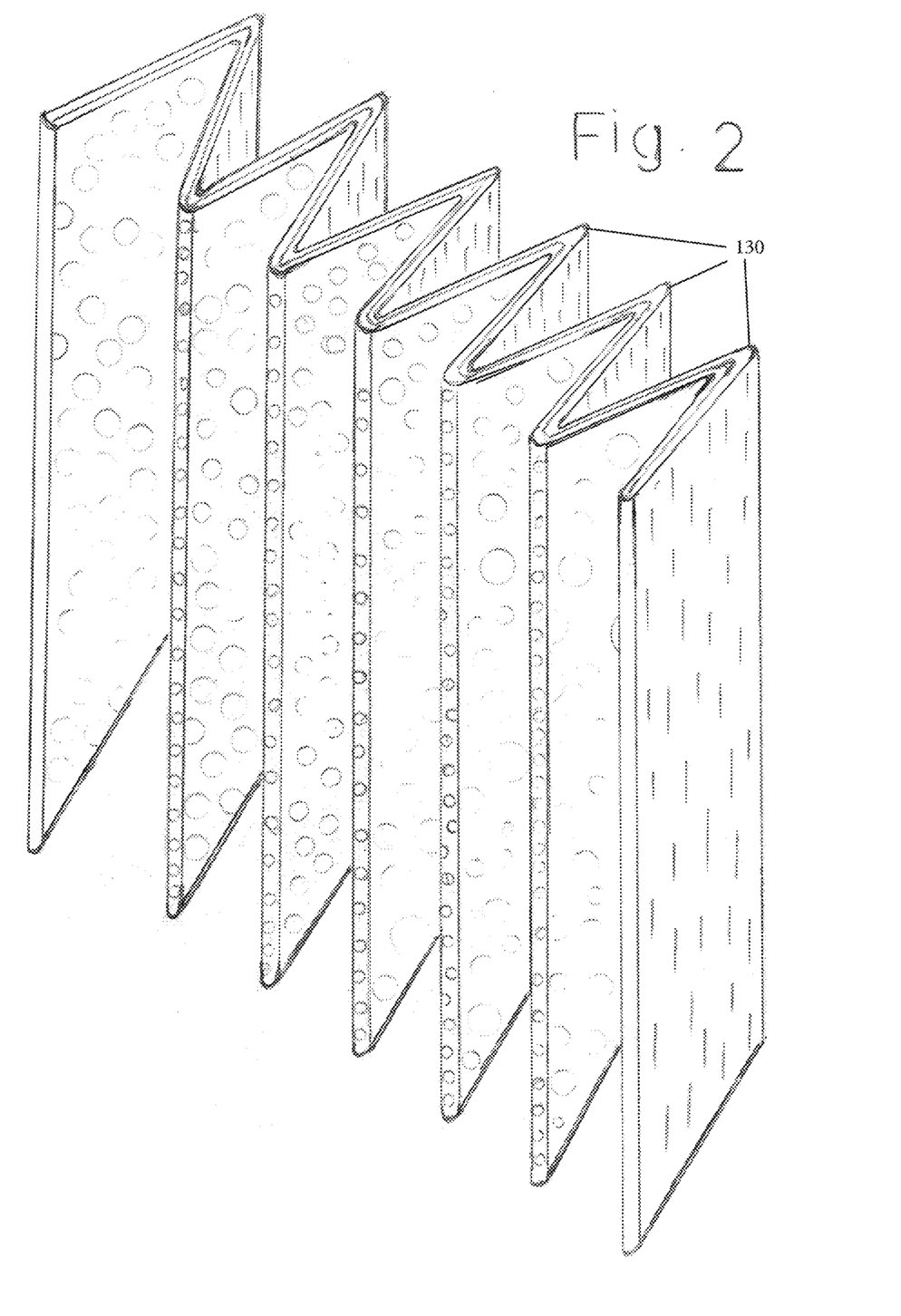
FIG. 2 is a perspective view of a multi-folded cutting mat having (Side A): Expanded Polystyrene (EPS) or Cork, and (Side B): Polyvinyl Chloride (PVC) or Corrugated Fiberboard.

Referring to FIG. 1, the mat 100 can be substantially rectangular in shape and elongated to have four linear sides, namely a first longitudinal side 102, a second longitudinal side 104 opposite the first longitudinal side, a first transverse side 106, and a second transverse side 108 opposite the first transverse side. The longitudinal sides 102, 104 are substantially orthogonal to the transverse sides 106, 108.

Figure 3:
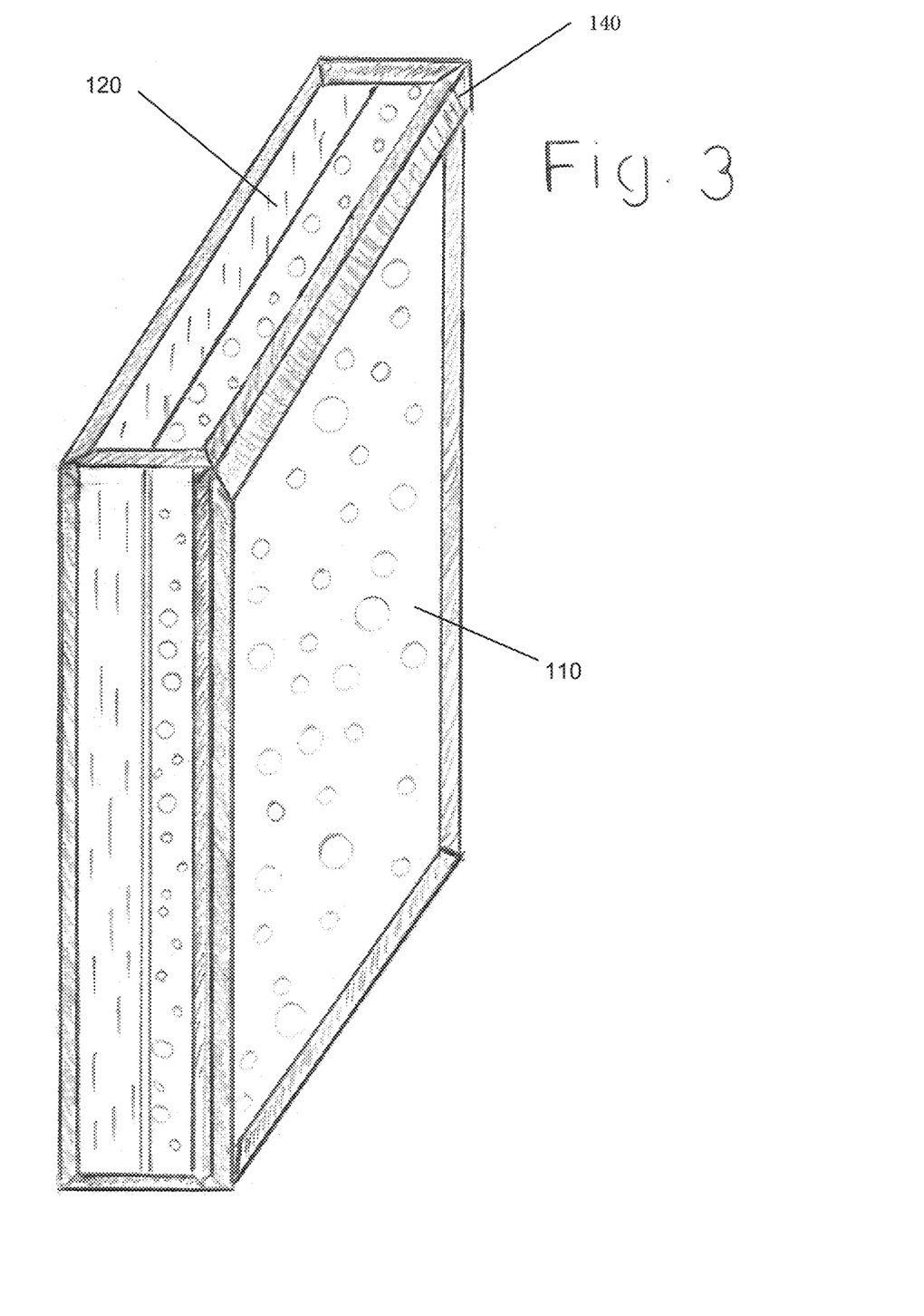
FIG. 3 is a perspective view of an encased cutting mat having Expanded Polystyrene (EPS) or Cork, and Polyvinyl Chloride (PVC) or Corrugated Fiberboard.

As best shown in FIG. 3, the dual side cutting mat 100 can be, for example, a flat board or panel 101 that has a first side layer 110 with a first outer surface 112 and a second side layer 120 with a second outer surface 122. The first layer 110 and first outer surface 112 are opposite the second layer 120 and second outer surface 122. In one non-limiting embodiment of the invention, the first layer 110 can be constructed, for example, of Expanded Polystyrene (EPS) or Cork and the second layer 120 can be constructed, for example, of polyvinyl chloride (PVC) or corrugated fiberboard. The EPS or Cork provides a surface 112 that can easily tolerate the insertion and removal of straight pins without damage to the surface 112. This allows an easy process of laying out and attaching fabric or craft and pattern to the mat surface for easy cutting. The PVC layer 120 provides a cutting surface. Accordingly, the user can use one surface 112 for a first purpose, such as pinning and measuring, and the second surface 122 for a second purpose different than the first purpose, such as cutting. As further shown in FIG. 3, a casing 140 can be provided to surround the mat when it is in the folded storage position. The case 140 protects the mat against damage.

Figure 4:
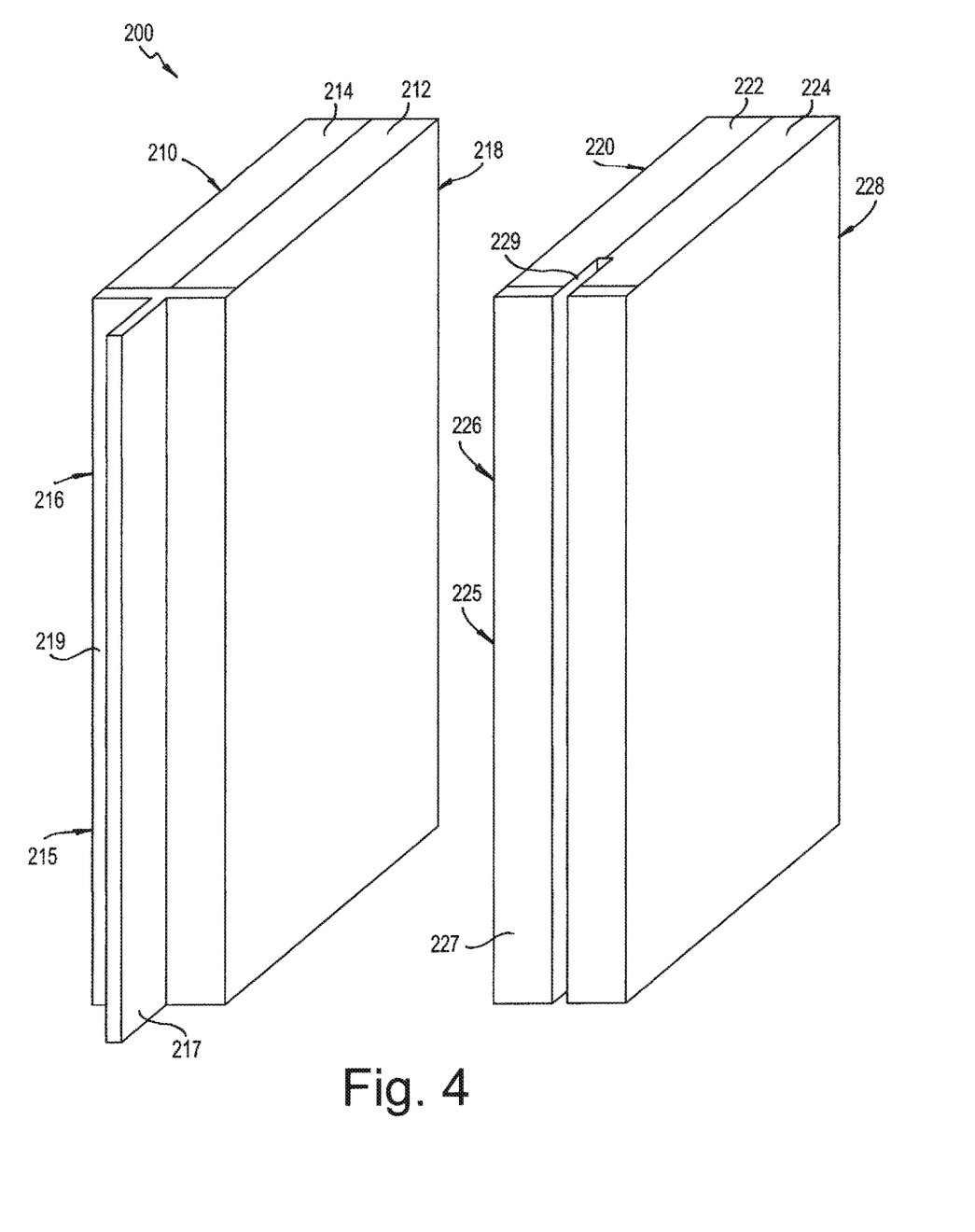
FIG. 4 is a perspective view of a cutting mat panel interlocking system having a protrusion that slides into an open slot.
Figure 5A:
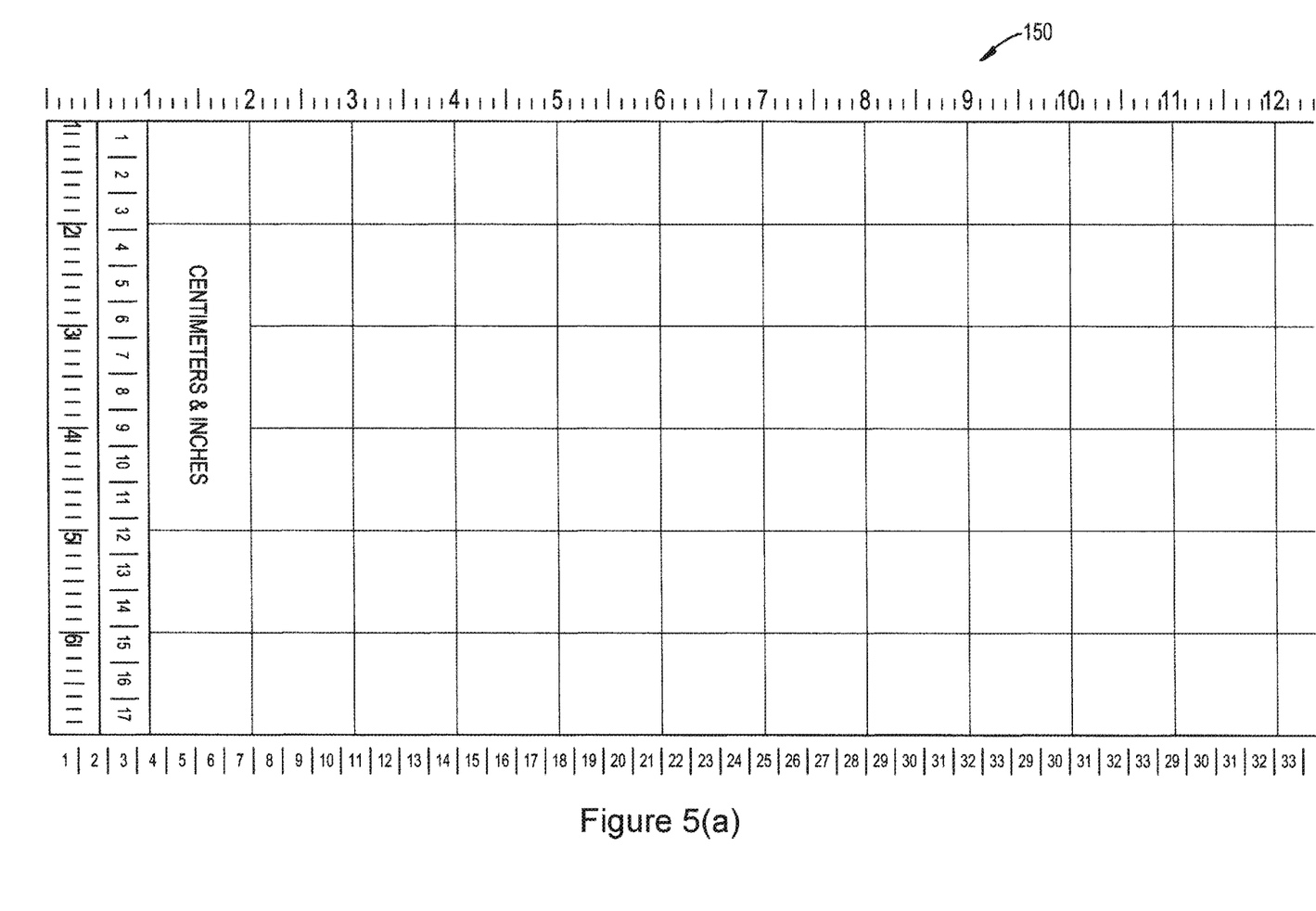
Figure 5B:
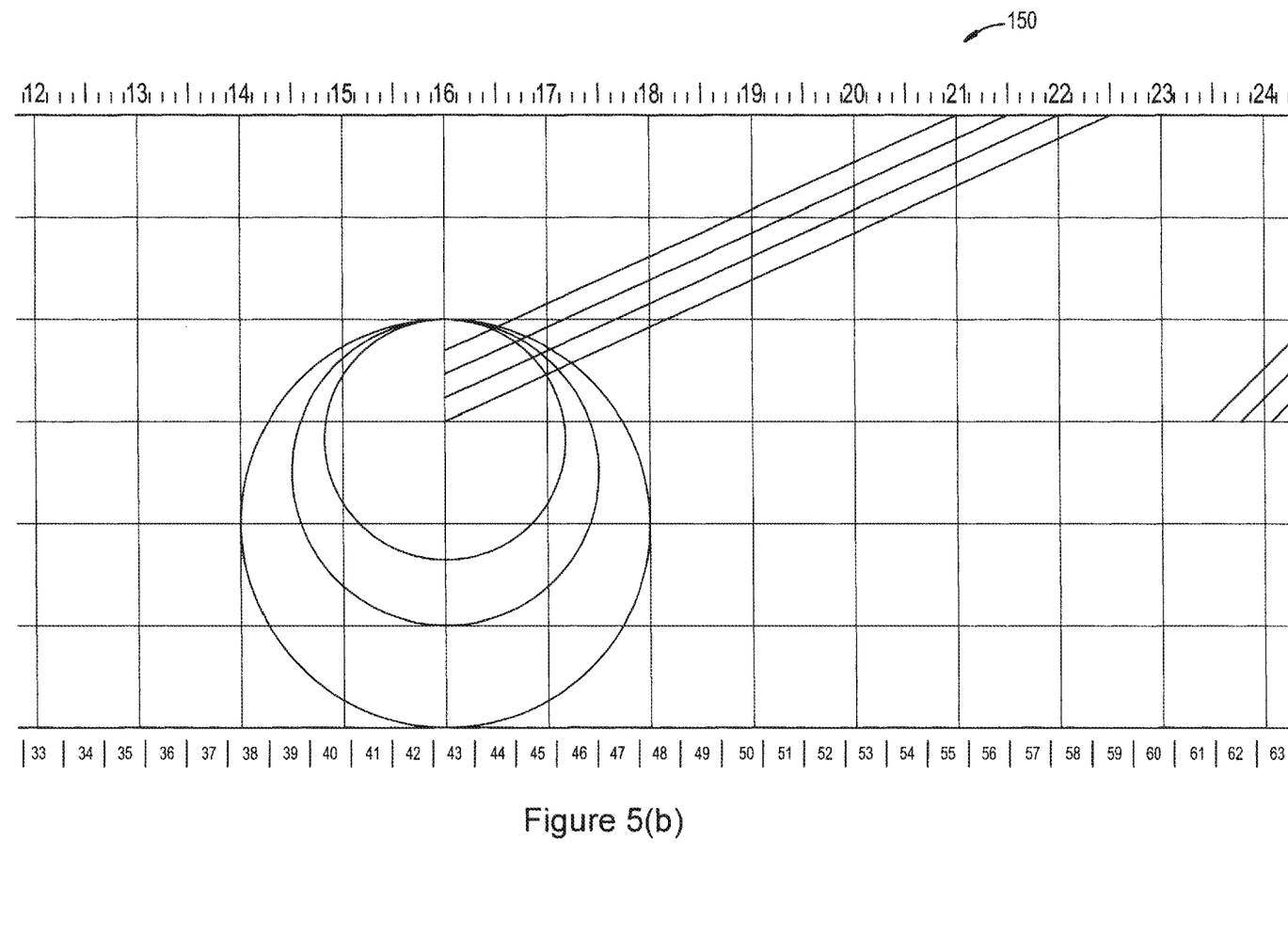
Figure 5C:
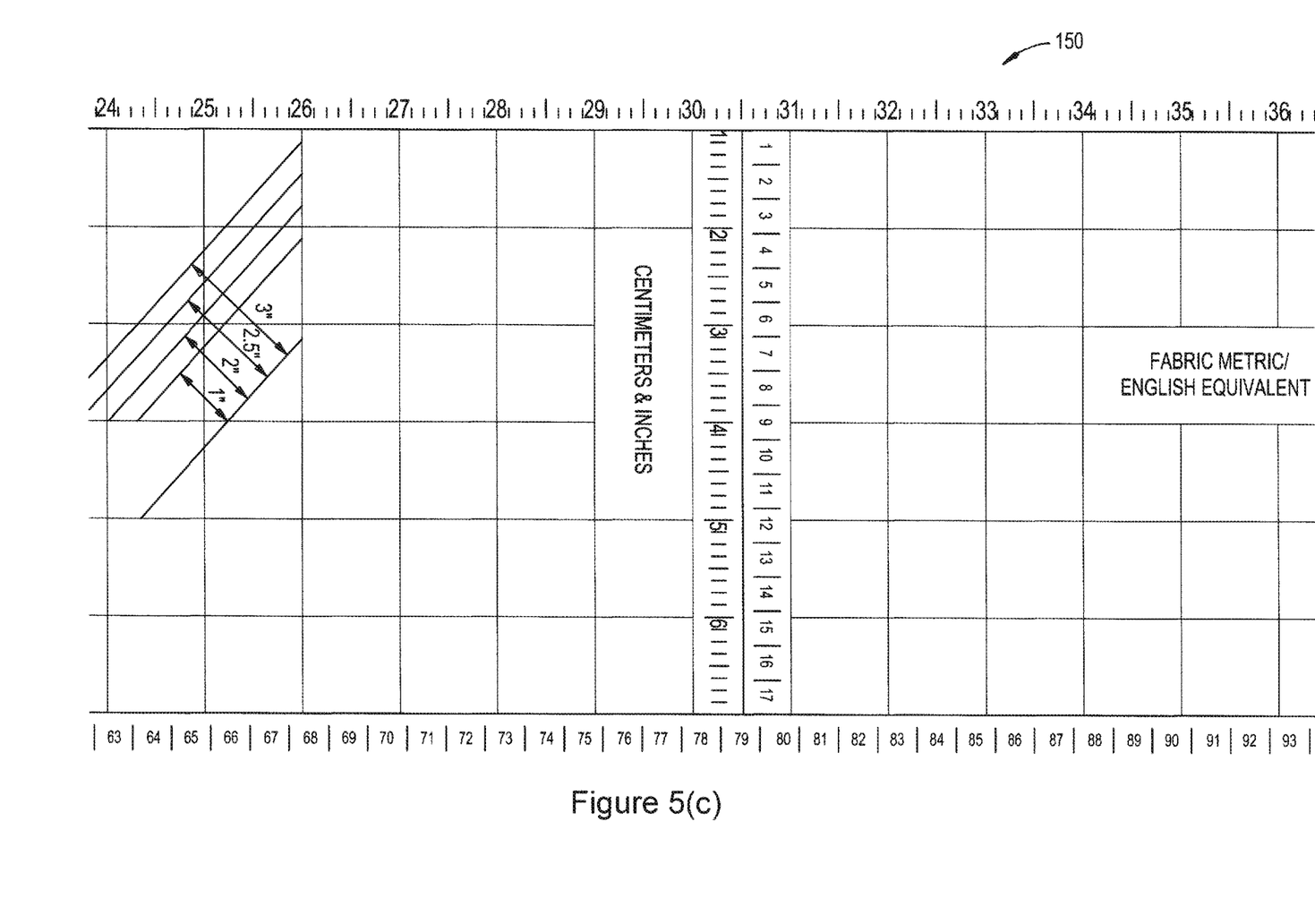
Figure 5D:
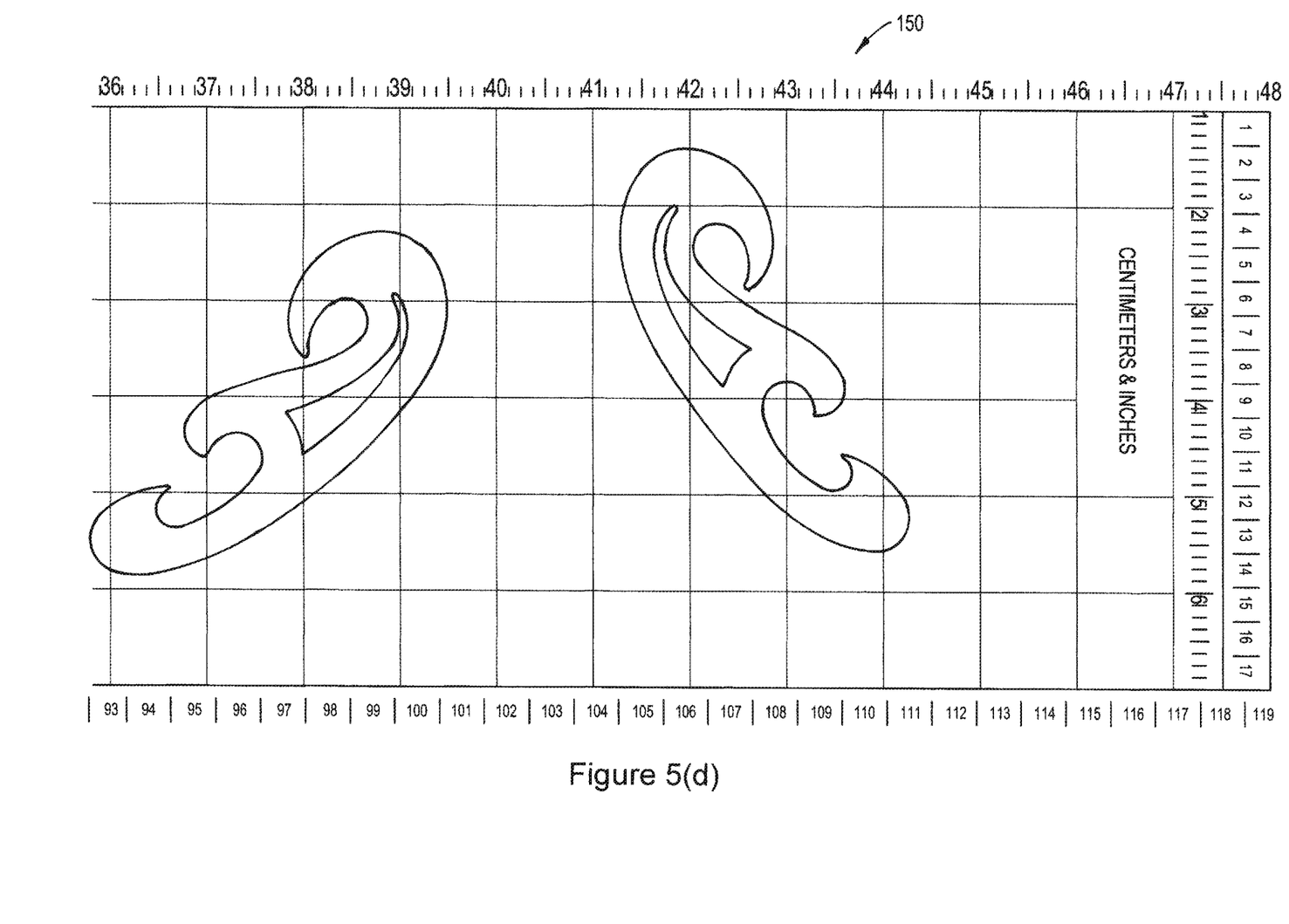

The mat 100 can be made of one single piece that is integral and can be folded, or can be more than one piece that are coupled together by fastening devices (FIG. 4). The two layers 110, 120 can be coupled together in any suitable manner, such as by glue or other adhesion, fasteners such as screws or rivets, magnets, or an encasement. Each layer 110, 120 can be any suitable thickness, such as ⅛-½ inch. The layers 110, 120 can have the same thickness, or different thicknesses.

FIGS. 5(*a*)-(*d*) show a display pattern 150. It is noted that the circles shown on the first surface 112 and the lines shown on the second surface 122 are provided for ease of illustration and description for this application and do not form part of the pattern 150, which is only illustrated in FIG. 5 and not shown in FIGS. 1-4. The pattern 150 can be provided on the first surface 112 and/or the second surface 122. The pattern 150 can be provided in any suitable manner, such as imprinting or by attaching a printed paper or the like. As shown, the pattern 150 can have measured gridlines in conventional measurements, or standard measuring tools and references to provide guidance, precision and accuracy. The EPS or Cork layer 110 can be used for precise or general cutting. The PVC layer 120 is self-healing allowing for the use of a rotary cutter. The corrugated surface will be used conventionally. Cutting mats are utilized for tabletop sewing, craft, design and drawing projects and also serve to protect these tabletop surfaces. The size of the mats will therefore vary in size from square inches to square feet to suit the larger work-table surface or production areas.

The mat 100 can have one or more folds 130. The folds 130 can be provided in any suitable manner. For example the folds 130 can be folds that are pre-formed in the mat 100. Or, the folds 130 can be score lines or cuts that extend fully or partially through the first and/or second layers 110, 120 to permit folding of thicker layers 110, 120. In the embodiment shown, the folds 130 extend transversely across the entire width of the mat 100, parallel to the transverse sides 106, 108 and from one longitudinal side 102 to the other longitudinal side 104.

For package and storage, large mats, size to be determined, will fold on itself in an accordion style (FIG. 2) or in two folds 130 to have three separate panels (FIG. 1). Thus, the mat 100 has a storage position in which the mat is folded on itself to provide a more compact configuration that facilitates storage. Thus, the first and/or outer surfaces can fold inward to contact itself. In the operating position, the mat 100 is unfolded so that the outer surfaces 112, 122 form a continuous uninterrupted surface for working.

An alternative illustrative, non-limiting embodiment is shown in FIG. 4. Here, the mat 200 has a series of separate and discrete boards or panels 210, 220 with an interlocking system that will form one large panel of the cutting mat. Though only two panels 210, 220 are shown, any number of panels can be provided. Each panel is generally rectangular in shape with four linear sides, though any suitable size and shape can be provided. In addition, each panel 210, 220 is formed of a respective first layer 212, 222 and a second layer 214, 224, as in FIGS. 1-3. And, each panel has a first transverse side 216, 226 and a second transverse side 218, 228, where the transverse side is defined by the shape of the mat 100 as a whole (noting that the transverse sides 216, 218, 226, 228 form the longer sides and thus the longitudinal sides) of that respective individual panel 210, 220. And, each panel has a first and second longitudinal sides (not labelled) that are substantially orthogonal to the transverse sides, where the longitudinal sides are defined by the size and shape of the entire mat 100 (noting that the longitudinal sides form the shorter sides (and thus the transverse sides) of the respective individual panel 210, 220.

Each panel 210, 220 has a respective interlocking apparatus 215, 225. The interlocking apparatus 215 of the first panel 210 has a first mating structure, here formed as a male member or protrusion 217 that extends outward from the end surface of a first transverse side 216 of the panel 210. The protrusion 217 can be formed in any suitable manner. For instance, the first mating structure can have a T-shaped cross-section formed by an optional support member or base 219 and the protrusion 217 can extend upright substantially orthogonal to the base 219. The base 219 can be connected to the end surface of the first transverse side 216, such as by an adhesive or other fastening mechanism. Or the protrusion 217 can be coupled to the panel 210 in any other suitable manner, such as by a fastening mechanism or being received in an opening formed in one or both of the layers 212, 214. The protrusion can extend the entire length of the first transverse side 216, from a first longitudinal side to the second longitudinal side, or multiple shorter protrusions can be provided, or one protrusion can be provided that only extends along a portion of the length of the first transverse side 216. The protrusion 217 has an elongated rectangular shape and is relatively thin or flat.

The second panel 220 also has an interlocking apparatus 225, here shown as a mating groove or slot 229. The slot 229 is formed in first and/or second layers 222, 224 at a first transverse side 226 of the second panel 220, as shown. The slot 229 is an elongated rectangular shape and is thus sized and shaped to interlock with the protrusion 217 of the first panel 210, such as by friction fit. The interlocking apparatus 225 can also be formed with a base or support member 227 formed at the distal end surface of the first transverse side 226, and attached such as by an adhesive. The support member 227 prevents the end surfaces from deteriorating and supports the reliable connection between the protrusion 217 and slot 229. The slot 229 can extend the entire length of the transverse side 226, or multiple smaller slots can be provided that align with multiple protrusions 217 of the first panel 210.

In operation, the user aligns the protrusion 217 with the slot 229 and slides the first and second panels 210, 220 together until the protrusion 217 is fully received in the slot 229. Each panel 210, 220 can have the same size (length, width and thickness, or just length (transverse side) and thickness) and shape, so that the outer surfaces of the first panel 210 will then align with the outer surfaces of the second panel 220. Accordingly, the matt 200 is formed by the individual panels 210, 220, that together form two continuous outer surfaces. It is further noted that although an interlocking apparatus 215, 225 is only shown at one transverse side 216, 226, an interlocking apparatus can also be provided at the opposite transverse side of each panel 210, 220. For example, the first panel 210 can have the male interlocking apparatus 215 at the first transverse side 216, and a female interlocking apparatus at the second transverse side 218. And, the second panel 220 can have the female interlocking apparatus 225 at the first transverse side 226, and a male interlocking apparatus at the second transverse side 228. In addition, any suitable interlocking apparatus can be utilized, though preferably without interfering with forming continuous uninterrupted outer surfaces between the first or second layers 212, 214, 222, 224 when joined together.

By providing panels 210, 220 that can removably interlock with one another, a modular mat 200 is achieved. The user can then join any number of modular panels together to form any size mat 200 that is needed for a particular application. For instance, for a 40"×72" mat, that may be six panels of 12"×40" or three panels of 24"×40". The interlocking system may be a slide-in system or snap-on locks. Thus, the mat 200 has a storage position in which the panels are separated from one another and can be stacked on top of each other to provide a compact configuration for storage. The mat 200 also has an operating position in which the panels are joined together to form a single continuous outer surfaces for use.

The entire cutting mat or separate panels can optionally be encased to provide a continuous smooth or finished edge. Both sides will be encased in a single frame. A magnet can also optionally be embedded in a portion of the mat to facilitate the use of the straight pins. For instance, a small magnet can be embedded under the outer surface to hold pins that are not currently being used.

Thus, a dual surface cutting mat is provided for, but not limited to, sewing, crafts, design and drawing. It is constructed of Expanded Polystyrene (EPS) or Cork on one side and corrugated fiberboard or polyvinyl chloride (PVC) on the other. The newly introduced EPS and Cork allow for an efficient means of pinning fabric or crafts to patterns and/or the cutting board. The fabric or craft may easily and quickly be cut, repositioned or removed. The EPS and Cork surface may be used for precise or general cutting and provides a convenient choice of working surfaces from one mat. The material for the layers 110, 120 can be any number of combinations, including EPS+PVC, EPS+Corrugated fiberboard, Cork+PVC, and Cork+Corrugated fiberboard.

One purpose of the invention is to allow for a cutting mat and cutting surface that makes easy the layout and attachment of fabric or crafts, with straight pins, to the mat surface. It also makes easy the layout and attachment of fabrics or crafts, using straight pins, to sewing patterns and reduces the risk of being injured by the straight pins used. In addition, the fabric and pattern can be easily and quickly removed once completed. The invention greatly decreases the time required to use straight pins to attach fabric or crafts to patterns, greatly decreases the time required remove straight pins, and greatly decreases the time to rearrange patterns and fabric. It provides effortless and faster cutting of secured fabric or craft, and allows convenient access to more than one working surface.

The invention allows multiple medium on which to cut fabric for sewing, allows multiple medium on which to cut craft items, allows ease in attaching pattern cutouts to fabric and crafts, allows ease in laying out fabric for assembly, allows ease in laying out fabric for cutting, and decreases the time required to assemble and cut fabric and crafts. It also decreases the time required to rearrange these items and to gather the final product.

It will be apparent that any size and shape mat can be provided. In one embodiment, the mat is 72 inches long by 40 inches wide. The thickness of the cork or EPS can be ¼ to ½ inches.

The description given of the embodiments, use, operation, implementation, material, design and construction of the indicated invention is not limited to what has been stated. What has been stated is simply illustrative.

It is further noted that the description uses several geometric or relational terms and directional or positioning terms, such as linear, longitudinal, transverse, parallel, orthogonal, top, bottom, and sides. Those terms are merely for convenience to facilitate the description based on the embodiments shown in the figures. Those terms are not intended to limit the invention. Thus, it should be recognized that the invention can be described in other ways without those geometric, relational, directional or positioning terms. In addition, the geometric or relational terms may not be exact. For instance, walls may not be exactly perpendicular or parallel to one another but still be considered to be substantially perpendicular or parallel because of, for example, roughness of surfaces, tolerances allowed in manufacturing, etc. And, other suitable geometries and relationships can be provided without departing from the spirit and scope of the invention.

Within this specification, the various sizes, shapes and dimensions are approximate and exemplary to illustrate the scope of the invention and are not limiting. The sizes and the terms "substantially" and "about" mean plus or minus 15-20%, more preferably plus or minus 10%, even more preferably plus or minus 5%, most preferably plus or minus 1-2%. In addition, while specific dimensions, sizes and shapes may be provided in certain embodiments of the invention, those are simply to illustrate the scope of the invention and are not limiting. Thus, other dimensions, sizes and/or shapes can be utilized without departing from the spirit and scope of the invention.

The foregoing description and drawings should be considered as illustrative only of the principles of the invention. The invention may be configured in a variety of shapes and sizes and is not intended to be limited by the preferred embodiment. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A fabric and/or crafts activity mat, comprising:
   a first fabric and/or craft layer formed of a first fabric and/or craft material configured to be utilized for a first fabric and/or craft activity, said first fabric and/or craft layer having a first fabric and/or craft working surface, wherein the first fabric and/or craft material is polyvinyl chloride or corrugated fiberboard; and
   a second fabric and/or craft layer formed of a second fabric and/or craft material configured to be utilized for a second fabric and/or craft activity different than the first fabric and/or craft activity, said second fabric and/or craft layer having a second fabric and/or craft working surface opposite the first fabric and/or craft working surface of said first fabric and/or craft layer, wherein the second fabric and/or craft material is expanded polystyrene or cork,
   said first fabric and/or craft layer comprising a discrete first fabric and/or craft layer having a first inner surface opposite the first fabric and/or craft working surface, said second fabric and/or craft layer having a second inner surface opposite the second fabric and/or craft working surface, wherein said first inner surface is coupled to the second inner surface, further comprising one or more folds formed by a cut extending at least partially through the first fabric and/or craft layer and/or the second fabric and/or craft layer.

2. The mat of claim 1, further comprising one or more folds formed by a cut extending at least partially through the first and/or second fabric and/or craft layers.

3. The mat of claim 1, wherein the first fabric and/or craft material is rigid.

4. The mat of claim 1, the mat comprising one or more panels, each panel having an interlocking apparatus that removably couples with another of the one or more panels.

5. The mat of claim 4, wherein the one or more panels form a single continuous surface when the one or more panels are coupled together.

6. A fabric and/or crafts activity mat, comprising:
   a first fabric and/or craft layer formed of a first fabric and/or craft material configured to be utilized for a first fabric and/or craft activity, said first fabric and/or craft layer having a first fabric and/or craft working surface wherein the first fabric and/or craft material is polyvinyl chloride or corrugated fiberboard; and a second fabric and/or craft layer formed of a second fabric and/or craft material configured to be utilized for a second fabric and/or craft activity different than the first fabric and/or craft activity, said second fabric and/or craft layer having a second fabric and/or craft working surface opposite the first fabric and/or craft working surface of said first fabric and/or craft layer, wherein the second fabric and/or craft material is expanded polystyrene or cork, said first fabric and/or craft layer comprising a discrete first layer having a first inner surface opposite the first fabric and/or craft working surface, said second fabric and/or craft layer having a second inner surface opposite the second fabric and/or craft working surface, wherein said first inner surface is coupled to the second inner surface, further comprising one or more folds formed by a cut extending at least partially through the second fabric and/or craft layer but not the first fabric and/or craft layer, or at least partially through the first fabric and/or craft layer but not the second fabric and/or craft layer.

7. The mat of claim 6, further comprising one or more folds formed by a cut extending at least partially through the first and/or second fabric and/or craft layers.

8. The mat of claim 6, wherein the first fabric and/or craft material is rigid.

9. The mat of claim 6, the mat comprising one or more panels, each panel having an interlocking apparatus that removably couples with another of the one or more panels.

10. The mat of claim 9, wherein the one or more panels form a single continuous surface when the one or more panels are coupled together.

11. A method for performing a first fabric and/or craft activity and second fabric and/or craft activity, comprising:

providing an activity mat having a first fabric and/or craft layer formed of a first fabric and/or craft material for performing a first fabric and/or craft activity on a first fabric and/or craft working surface of the activity mat, wherein the first material is polyvinyl chloride or corrugated fiberboard;

providing a second fabric and/or craft layer of the activity mat, the second fabric and/or craft layer formed of a second fabric and/or craft material for performing a second fabric and/or craft activity different than the first fabric and/or craft activity on a second fabric and/or craft working surface of the activity mat opposite the first working surface of the first fabric and/or craft layer, wherein the second fabric and/or craft material is expanded polystyrene or cork, wherein the first fabric and/or craft layer comprises a discrete first fabric and/or craft layer having a first inner surface opposite the first fabric and/or craft working surface, the second fabric and/or craft layer having a second inner surface opposite the second fabric and/or craft working surface, wherein the first inner surface is coupled to the second inner surface; and forming one or more folds by a cut extending at least partially through the first fabric and/or craft layer and/or the second fabric and/or craft layer.

12. The method of claim 11, wherein the first fabric and/or craft activity comprises cutting fabrics and/or crafts on the first fabric and/or craft working surface and the second fabric and/or craft activity comprises insertion and removal of pins at the second fabric and/or craft working surface without damage to the second fabric and/or craft working surface.

\* \* \* \* \*